US011252204B2

(12) United States Patent
Kasuga

(10) Patent No.: US 11,252,204 B2
(45) Date of Patent: Feb. 15, 2022

(54) CONTENT SHARING SYSTEM, CONTENT SHARING METHOD, AND PROGRAM

(71) Applicant: RAKUTEN GROUP, INC., Tokyo (JP)

(72) Inventor: Takaya Kasuga, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/646,137

(22) PCT Filed: Oct. 10, 2017

(86) PCT No.: PCT/JP2017/036633
§ 371 (c)(1),
(2) Date: Mar. 10, 2020

(87) PCT Pub. No.: WO2019/073516
PCT Pub. Date: Apr. 18, 2019

(65) Prior Publication Data
US 2020/0220908 A1 Jul. 9, 2020

(51) Int. Cl.
*H04L 29/06* (2006.01)
*G06F 3/14* (2006.01)

(52) U.S. Cl.
CPC ........ *H04L 65/4015* (2013.01); *G06F 3/1454* (2013.01); *H04L 65/4046* (2013.01)

(58) Field of Classification Search
CPC ........... H04L 65/4015; H04L 65/4046; G06F 3/1454
See application file for complete search history.

(56) References Cited

U.S. PATENT DOCUMENTS

| 6,158,903 A * | 12/2000 | Schaeffer | G06Q 10/10 709/204 |
|---|---|---|---|
| 9,667,676 B1 * | 5/2017 | Lo | G06F 40/166 |
| 10,909,080 B2 * | 2/2021 | Hyams | G06F 16/1767 |
| 2006/0282548 A1 * | 12/2006 | Yoshida | G06Q 10/10 710/1 |
| 2009/0157811 A1 * | 6/2009 | Bailor | G06F 16/1767 709/204 |

(Continued)

FOREIGN PATENT DOCUMENTS

| JP | 2006331309 A | 12/2006 |
|---|---|---|
| JP | 5977450 B2 | 8/2016 |
| WO | 2016067363 A1 | 5/2016 |

*Primary Examiner* — Philip J Chea
*Assistant Examiner* — Robert B McAdams
(74) *Attorney, Agent, or Firm* — HEA Law PLLC

(57) ABSTRACT

Provided are a content sharing system, a content sharing method, and a program, which are capable of appropriately processing an operation of a use on shared content after a display update by an operation of another user is performed. An object processing execution module executes the predetermined processing on an object that is in a focus state at a timing that is before a time earlier than the operation of instructing of execution of the predetermined processing by the predetermined time period and that is closest to the time earlier than the operation by the predetermined time period, when it is identified that the display update of the shared content has been performed by the operation of another user during as predetermined time period until the operation.

7 Claims, 12 Drawing Sheets

(56) References Cited

U.S. PATENT DOCUMENTS

| | | | |
|---|---|---|---|
| 2014/0215302 A1* | 7/2014 | Little | G06F 40/174 |
| | | | 715/229 |
| 2014/0337760 A1* | 11/2014 | Heinrich | G06F 40/166 |
| | | | 715/753 |
| 2016/0072863 A1* | 3/2016 | Wu | H04L 65/1089 |
| | | | 715/753 |
| 2016/0192008 A1 | 6/2016 | Terui | |
| 2016/0371752 A1 | 12/2016 | Taniuchi et al. | |

* cited by examiner

FIG.5

| TIMING INFORMATION | OBJECT IDENTIFICATION INFORMATION | FOCUS INFORMATION |
|---|---|---|
| t1 | A | on |
| t2 | A | off |
| t3 | B | on |
| t4 | B | off |
| t5 | C | on |

FIG.7

| SERIAL NUMBER | CURSOR POSITION INFORMATION | OBJECT INFORMATION (SELECTION BOX 48a) | | | |
|---|---|---|---|---|---|
| | | POSITION INFORMATION | SIZE INFORMATION | SCROLL USER INFORMATION | CLICKABILITY INFORMATION |
| 1 | (x11,y11) | (x21,y21) | (a21,b21) | USER B | Y |
| 2 | (x12,y12) | (x22,y22) | (a22,b22) | USER B | Y |
| 3 | (x13,y13) | (x23,y23) | (a23,b23) | USER B | Y |

CONTENT SHARING SYSTEM, CONTENT SHARING METHOD, AND PROGRAM

CROSS REFERENCE TO RELATED APPLICATIONS

This application is a National Stage of International Application No. PCT/JP2017/036633 filed on Oct. 10, 2017. The contents of the above document is incorporated herein by reference in its entirety.

TECHNICAL FIELD

The present invention relates to a content sharing system, a content sharing method, and a program.

BACKGROUND ART

There exist systems in which a plurality of users can perform operations on shared content. For example, in Patent Literature 1, there is described a system in which any one of a plurality of users can perform a drawing operation on a shared whiteboard. In the technology described in Patent Literature 1, the details of the drawing operation on a whiteboard displayed on a display unit of a terminal device are reflected on a whiteboard displayed on a display unit of another terminal device connected to the terminal device via a network.

In the technology described in Patent Literature 1, even when a display update is performed by another user while the user is performing a drawing operation on the whiteboard, the whiteboard can be returned to the state before the display update by performing a predetermined operation.

CITATION LIST

Patent Literature

[PTL 1] JP 2006-331309 A
[PTL 2] JP 5977450 B2
[PTL 3] WO 2016/067363 A1

SUMMARY OF INVENTION

Technical Problem

The inventors of the present invention are investigating implementation of a system in which a plurality of users can per form operations on shared content, for example, webpages, in which a selection box or other such objects are arranged. In such a system, in a case where the user is to perform an operation of selecting an object, when a display update of the shared content is performed by an operation of another user, the object intended by the user may not be selected. Further, in such a situation, an object different from that intended by the user may be selected.

In this regard, in Patent Literature 1, there is no description of processing corresponding to a drawing operation of the user on the whiteboard after a display update under a situation in which the display update is performed by an operation of another user when the user is to perform the drawing operation. In the technologies described in Patent Literature 2 and Patent Literature 3, in which processing is executed in accordance with an intention of the user, a display update of the shared content by an operation of another user is not expected in the first place.

The present invention has been made in view of the above-mentioned circumstances. It is an object of the present invention to provide a content sharing system, a content sharing method, and a program, which are capable of appropriately processing an operation of a user on shared content after a display update by an operation of another user is performed.

Solution to Problem

In order to solve the problem described above, according to one embodiment of the present invention, there is provided a content sharing system including: cursor position identification means for identifying a position of a cursor arranged on shared content operable by both of a first user and a second user; focus state determination means for determining whether an object on the shared content is in a focus state or in a non-focus state, based on the position of the cursor; operation identification means for identifying that an operation has been performed by the first user, the operation being an operation of execution instruction of predetermined processing; display update identification means for identifying a display update of the shared content by an operation of the second user; and processing execution means for executing the predetermined processing on an object that is in a focus state at a timing that is before a time earlier than the operation of execution instruction of the predetermined processing by the predetermined time period and that is closest to the time earlier than the operation by the predetermined time period, when it is identified that the display update has been performed during a predetermined time period until the operation.

In one aspect of the present invention, the processing execution means executes the predetermined processing on an object that is in a focus state at a time earlier than a timing of the operation of execution instruction of the predetermined processing by the predetermined time period and that is brought into a non-focus state during the predetermined time period until the operation, when it is identified that the display update has been performed during the predetermined time period until the operation.

Further, in one aspect of the present invention, the processing execution means executes the predetermined processing on an object that is in a focus state at a timing that is before the time earlier than the operation of execution instruction of the predetermined processing by the predetermined time period and that is closest to the time earlier than the operation by the predetermined time period, further when a length between a position of the cursor on the shared content at the time earlier than the operation of execution instruction of the predetermined processing by the predetermined time period and a position of the cursor on the shared content at a timing of the operation of execution instruction of the predetermined processing is shorter than a predetermined length.

Further, in one aspect of the present invention, the processing execution means executes the predetermined processing on an object that is in a focus state at a timing that is before the time earlier than the operation of execution instruction of the predetermined processing by the predetermined time period and that is closest to the time earlier than the operation by the predetermined time period, further when there is no object in a focus state at the timing of the operation.

Further, in one aspect of the present invention, the processing execution means executes the predetermined processing on an object in a focus state at a timing that is before the time earlier than the operation of execution instruction of the predetermined processing by the predetermined time period and that is closest to the time earlier than the operation by the predetermined time period, further when the display update has not been performed before the time earlier than the operation of execution instruction of the predetermined processing by the predetermined time period.

Further, according to one embodiment of the present invention, there is provided a content sharing method including the steps of: identifying a position of a cursor arranged on shared content operable by both of a first user and a second user; determining whether an object on the shared content is in a focus state or in a non-focus state, based on the position of the cursor; identifying that an operation has been performed by the first user, the operation being an operation of execution instruction of predetermined processing; identifying a display update of the shared content by an operation of the second user; and executing the predetermined processing on an object that is in a focus state at a timing that is before a time earlier than the operation of execution instruction of the predetermined processing by the predetermined time period and that is closest to the time earlier than the operation by the predetermined time period, when it is identified that the display update has been performed during a predetermined time period until the operation.

Further, according to one embodiment of the present invention, there is provided a program for causing a computer to execute the procedures of: identifying a position of a cursor arranged on shared content operable by both of a first user and a second user; determining whether an object on the shared content is in a focus state or in a non-focus state, based on the position of the cursor; identifying that an operation has been performed by the first user, the operation being an operation of execution instruction of predetermined processing has been performed by the first user; identifying a display update of the shared content by an operation of the second user; and executing the predetermined processing on an object that is in a focus state at a timing that is before a time earlier than the operation of execution instruction of the predetermined processing by the predetermined time period and that is closest to the time earlier than the operation by the predetermined time period, when it is identified that the display update has been performed during a predetermined time period until the operation.

BRIEF DESCRIPTION OF DRAWINGS

FIG. 5 is a table for showing an example of focus history information.

FIG. 7 is a table for showing an example of position history information.

DESCRIPTION OF EMBODIMENTS

Now, an embodiment of the present invention is described with reference to the drawings.

Figure 1:
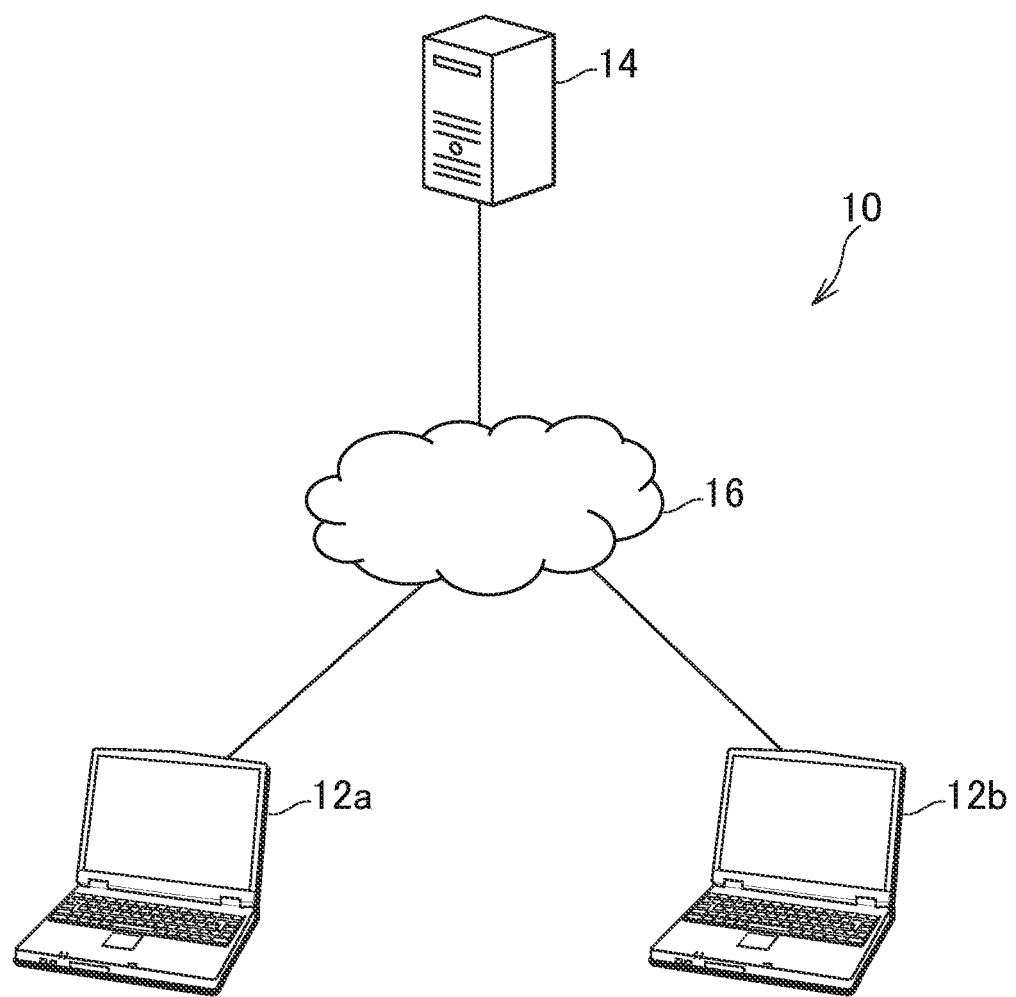
FIG. 1 is a diagram for illustrating an example of an overall configuration of a content sharing system according to an embodiment of the present invention.

FIG. 1 is a diagram for illustrating an example of an overall configuration of a content sharing system 10 according to the embodiment of the present invention. As illustrated in FIG. 1, the content sharing system 10 in this embodiment includes two user terminals 12 (12a, 12b) and a server 14. The user terminal 12a, the user terminal 12b, and the server 14 are connected to a computer network 16, for example, the Internet. Therefore, the user terminal 12a, the user terminal 12b, and the server 14 can communicate to and from each other via the computer network 16.

In this embodiment, for example, the user terminals 12 are a computer such as a personal computer, a tablet terminal, or a smartphone. A web browser is installed on each user terminal 12 in this embodiment.

Figure 2:
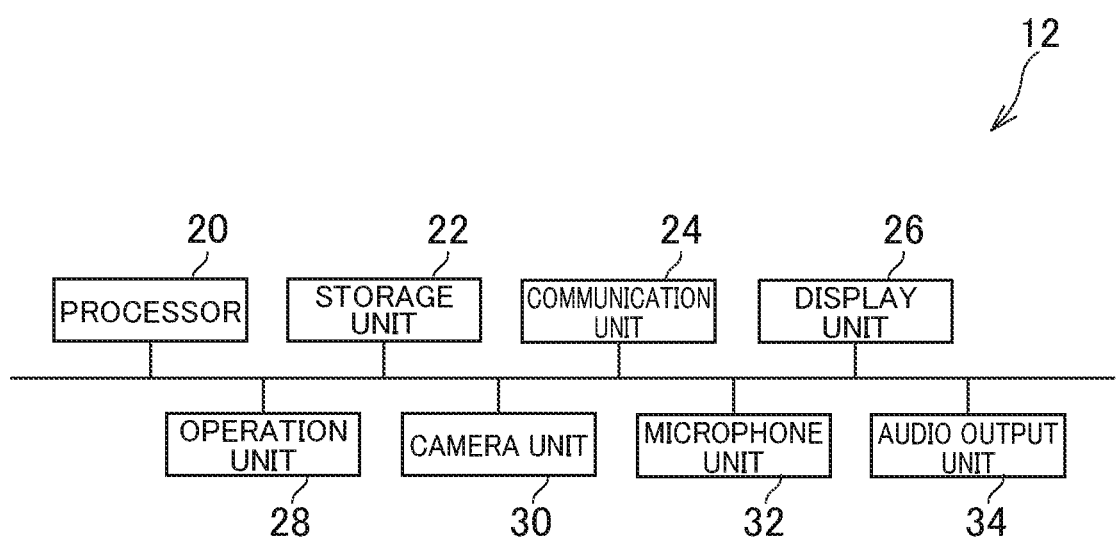
FIG. 2 is a diagram for illustrating an example of a configuration of a user terminal according to an embodiment of the present invention.

As illustrated in FIG. 2, for example, each user terminal 12 includes a processor 20, a storage unit 22, a communication unit 24, a display unit 26, an operation unit 28, a camera unit 30, a microphone unit 32, and an audio output unit 34.

The processor 20 is, for example, a program control device, for example, a central processing unit (CPU), which is configured to operate in accordance with a program installed on the user terminal 12. The storage unit 22 is, for example, a storage element such as a ROM or a RAM, or a hard disk drive. The communication unit 24 is a communication interface such as a network board or a wireless LAN module. The display unit 26 is, for example, a display such as a liquid crystal display or an organic EL display. The operation unit 28 is, for example, a user interface such as a mouse, a keyboard, or a touch pad, which is configured to output to the processor 20 input data corresponding to operation input. The camera unit 30 is a camera, for example, a digital camera. The microphone unit 32 is, for example, a microphone configured to convert a surrounding sound into sound data to output the sound data to the processor 20. The audio output unit 34 is a device such as headphones or a speaker, which is configured to output a sound to the user.

The server 14 is a server computer, for example, a web server, which is configured to provide shared content operable by both the user of the user terminal 12a and the user of the user terminal 12b. Examples of the shared content include webpages and images. The user of the user terminal 12a is hereinafter referred to as "user A", and the user of the user terminal 12b is hereinafter referred to as "user B". A video chat function between the user terminals 12 is implemented on the server 14 in this embodiment. A function for synchronizing the shared content displayed on the display unit 26 of the user terminal 12a with the shared content displayed on the display unit 26 of the user terminal 12b is also implemented on the server 14 in this embodiment.

In this embodiment, for example, through use of the camera unit 30, the microphone unit 32, and the audio output unit 34, the user A and the user B can talk to each other by voice while looking at the face of the other user via video chat.

The shared content displayed on the display unit 26 of the user terminal 12a and the shared content displayed on the display unit 26 of the user terminal 12b are synchronized. Therefore, the user A and the user B can talk to each other by voice while seeing the same part of the same shared content.

In this embodiment, for example, the details of the operation performed at the user terminal 12a are reflected not only in the shared content displayed on the display unit 26 of the user terminal 12a, but also reflected in the shared content displayed on the display unit 26 of the user terminal 12b. Similarly, for example, the details of the operation performed at the user terminal 12b are reflected not only in the shared content displayed on the display unit 26 of the user terminal 12b, but also reflected in the shared content displayed on the display unit 26 of the user terminal 12a.

Therefore, for example, when virtual face-to-face sales are performed under a situation in which the user A is a prospective customer and the user B is a seller, it can be said that the content sharing system 10 of this embodiment is a particularly suitable system.

Figure 3A:
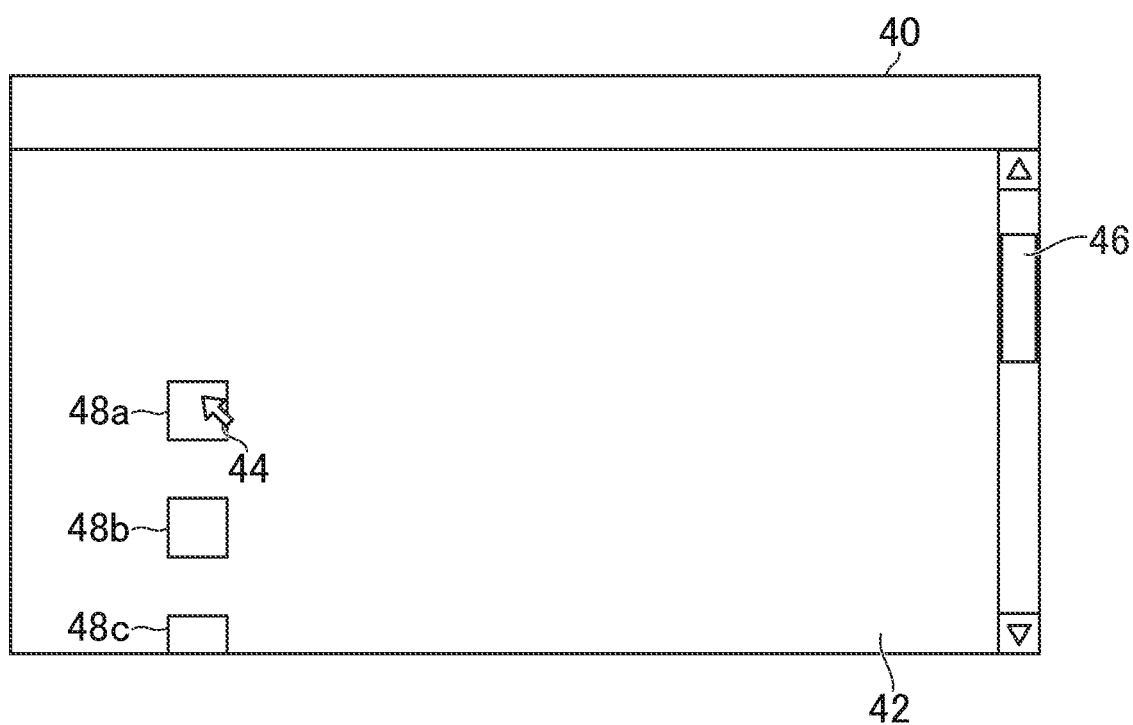
FIG. 3A is a diagram for illustrating an example of a window.

It is assumed, for example, that a webpage is shared between the user terminal 12a and the user terminal 12b, and that a web browser window 40 illustrated as an example in FIG. 3A is displayed on the display unit 26 of the user terminal 12a. In this case, the window 40 is also displayed on the display unit 26 of the user terminal 12b.

As illustrated in FIG. 3A, a part of a webpage 42 is arranged in the window 40. The entire webpage 42 does not fit in the window 40. The user A and the user B can visually recognize the part of the entire webpage 42 arranged in the window 40.

A cursor 44 is also illustrated in FIG. 3A. In this embodiment, the shared content displayed on the display unit 26 is shared by the user terminal 12a and the user terminal 12b, but the position of the cursor 44 is not shared by the user terminal 12a and the user terminal 12b. That is, the position of the cursor 44 in the user terminal 12a and the position of the cursor 44 in the user terminal 12b are independent and do not affect each other. The user B does not know the position of the cursor 44 on the user terminal 12a, and similarly, the user A does not know the position of the cursor 44 on the user terminal 12b.

In this embodiment, both the user A and the user B can scroll the webpage 42 up and down to change the part of the entire webpage 42 arranged in the window 40. For example, the webpage 42 can be scrolled by using the cursor 44 to perform a drag operation on the scroll bar 46 or a click operation on a part above or below the scroll bar 46. In the following description, it is assumed that the webpage 42 is scrolled in the up-down direction, but the webpage 42 may be scrolled in the left-right direction. The webpage 42 may also be scrollable in the up-down and left-right directions.

An operation of scrolling the webpage 42 is hereinafter referred to as "scroll operation", and processing of changing a part of the webpage 42 arranged in the window 40 in accordance with the scroll operation is hereinafter referred to as "scroll processing".

In the webpage 42, various objects are arranged. For example, in the webpage 42 illustrated in FIG. 3A, three selection boxes 48 (48a, 48b, and 48c) are arranged. In addition to this, for example, objects such as a radio button, a "send" button, and a pull-down menu may also be arranged on the webpage 42.

In this embodiment, for each of the objects arranged on the webpage 42, it is determined whether the object is in a focus state or in a non-focus state based on the position of the cursor 44. For example, when there is an object on which the cursor 44 is arranged, it may be determined that the object is in a focus state. Even in a case where the cursor 44 is not arranged on an object, when there is an object arranged within a predetermined length from the position of the cursor 44, the object may be determined to be in a focus state.

The user can perform a selection operation on an object arranged on the webpage 42. For example, the user can perform the selection operation by performing a click operation.

In response to the selection operation, predetermined processing is executed on the object in a focus state. For example, when a selection operation is performed on an unchecked selection box 48 that is in a focus state, the selection box 48 changes to a checked state. Conversely, for example, when a selection operation is performed on a checked selection box 48 that is in a focus state, the selection box 48 changes to an unchecked state. In this way, processing of changing the check state of the selection boxes 48 is executed on the selection boxes 48 in accordance with the selection operation.

The predetermined processing executed on an object in response to a selection operation on the object is hereinafter referred to as "object processing". In the above-mentioned example, the processing of changing the check state corresponds to object processing on a selection box 48. In this case, the selection operation can be said to be an operation of execution instruction of object processing.

In this embodiment, object processing is determined in advance for each type of object. For example, for a radio button, processing of changing the selection state of a group of radio buttons including the radio button such that the radio button on which the selection operation is performed is brought into a selected state corresponds to object processing. As another example, for a pull-down menu, processing of changing a state of the pull-down menu to a state in which options of the pull-down menu on which the selection operation is performed are displayed in a list corresponds to object processing. As yet another example, for a "send" button, processing of transmitting information indicating the state of each object arranged on the webpage 42 to the server 14 corresponds to object processing.

It is assumed, for example, as illustrated in FIG. 3A, that the user A is trying to perform a selection operation on the selection box 48a, and the cursor 44 is arranged on the selection box 48a in the user terminal 12a. In this case, it is assumed that the selection box 48a is in a focus state, the selection box 48b and the selection box 48c are in a non-focus state, and the webpage 42 is stopped without being scrolled.

It is also assumed that the user B has performed a scroll operation on the webpage 42 while the user A is trying to perform a selection operation on the selection box 48a. In the user terminal 12a and the user terminal 12b, scroll processing on the webpage 42 is executed, and the state illustrated in FIG. 3E is obtained after going through the states illustrated in FIG. 3B, FIG. 3C, and FIG. 3D. In the state illustrated in FIG. 3B, the selection box 48a, which is in a focus state in the state illustrated in FIG. 3A, has changed to a non-focus state. In the state illustrated in FIG.

Figure 3B:
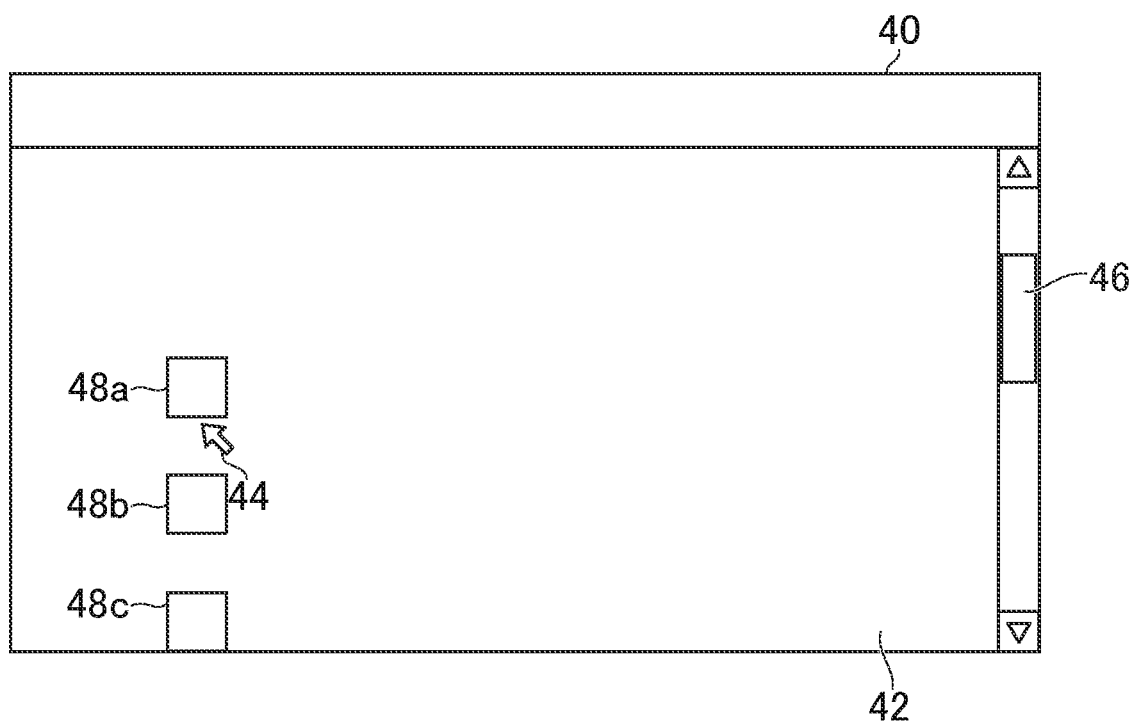
FIG. 3B is a diagram for illustrating an example of a window.
Figure 3C:
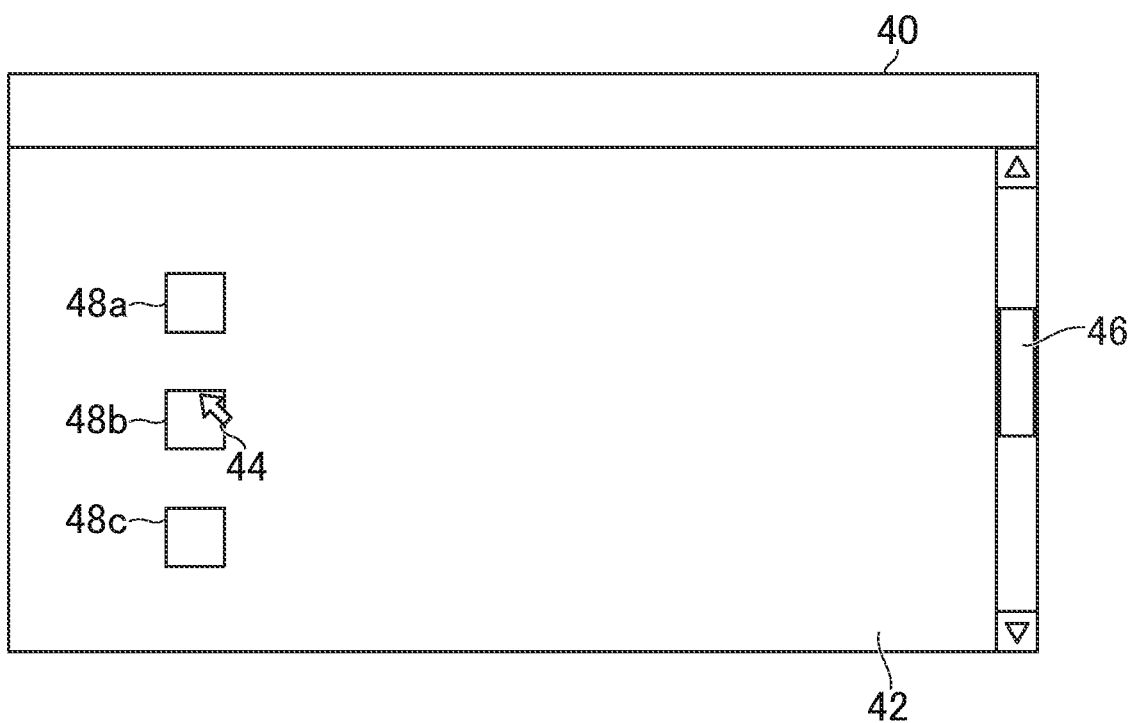
FIG. 3C is a diagram for illustrating an example of a window.
Figure 3D:
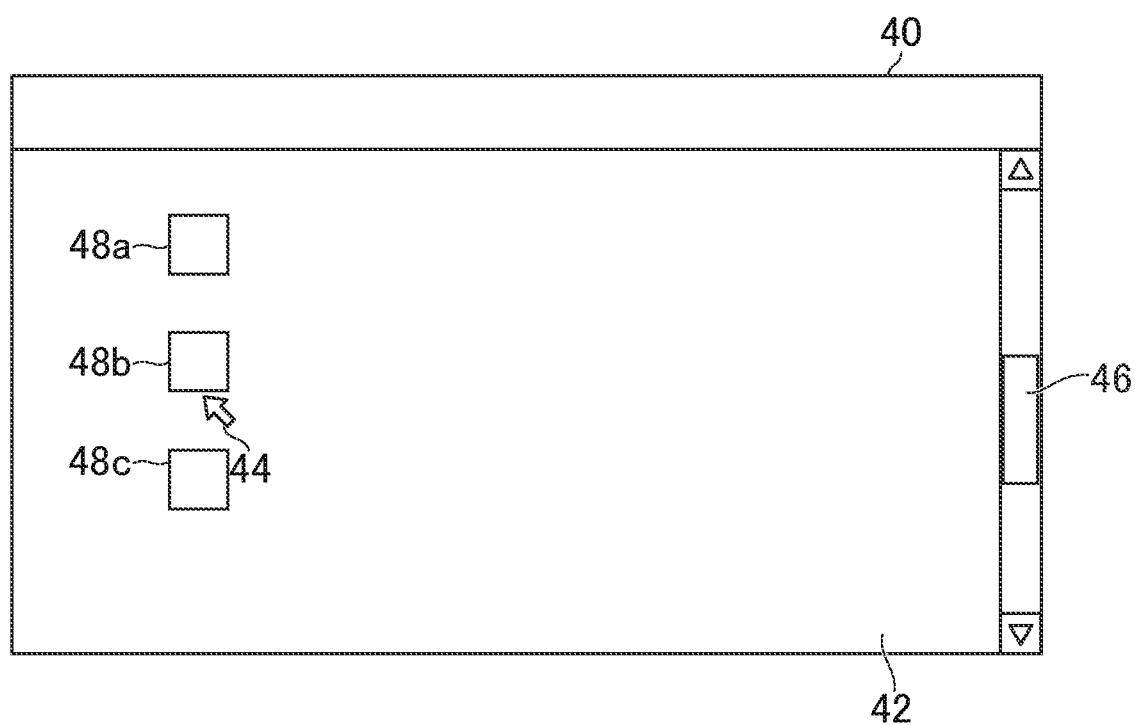
FIG. 3D is a diagram for illustrating an example of a window.
Figure 3E:
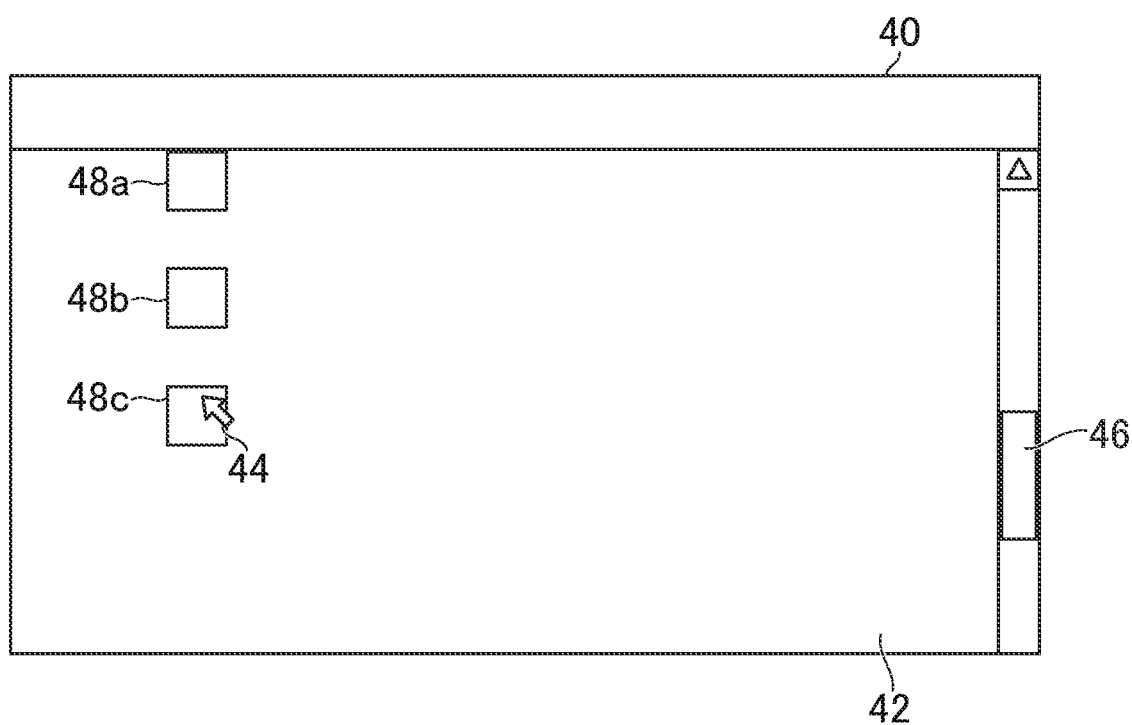
FIG. 3E is a diagram for illustrating an example of a window.

3C, the selection box 48b, which is in a non-focus state under the state illustrated in FIG. 3B, has changed to a focus state. In the state illustrated in FIG. 3D, the selection box 48b, which is in a focus state in the state illustrated in FIG. 3C, has changed to a non-focus state. In the state illustrated in FIG. 3E, the selection box 48c, which is in a non-focus state under the state illustrated in FIG. 3D, has changed to a focus state.

It is assumed that the selection operation in the state illustrated in FIG. 3E can be recognized by the user terminal 12a. For example, a time period from the timing at which the user A tries to perform the selection operation until the timing at which the user terminal 12a recognizes the selection operation is set as a time period T1. More specifically, it is assumed that the window 40 is in the state illustrated in FIG. 3A at a timing that is earlier by the time period T1 than the timing at which the selection operation is recognized by the user terminal 12a. For example, a time period of about 0.5 second is assumed as the time period T1. The timing that is earlier by the time period T1 than the timing of the selection operation is referred to as "reference timing". The time period T1 is not required to be 0.5 second, and may be any time period. For example, the time period T1 may be set based on experimental results or experience.

Figure 3F:
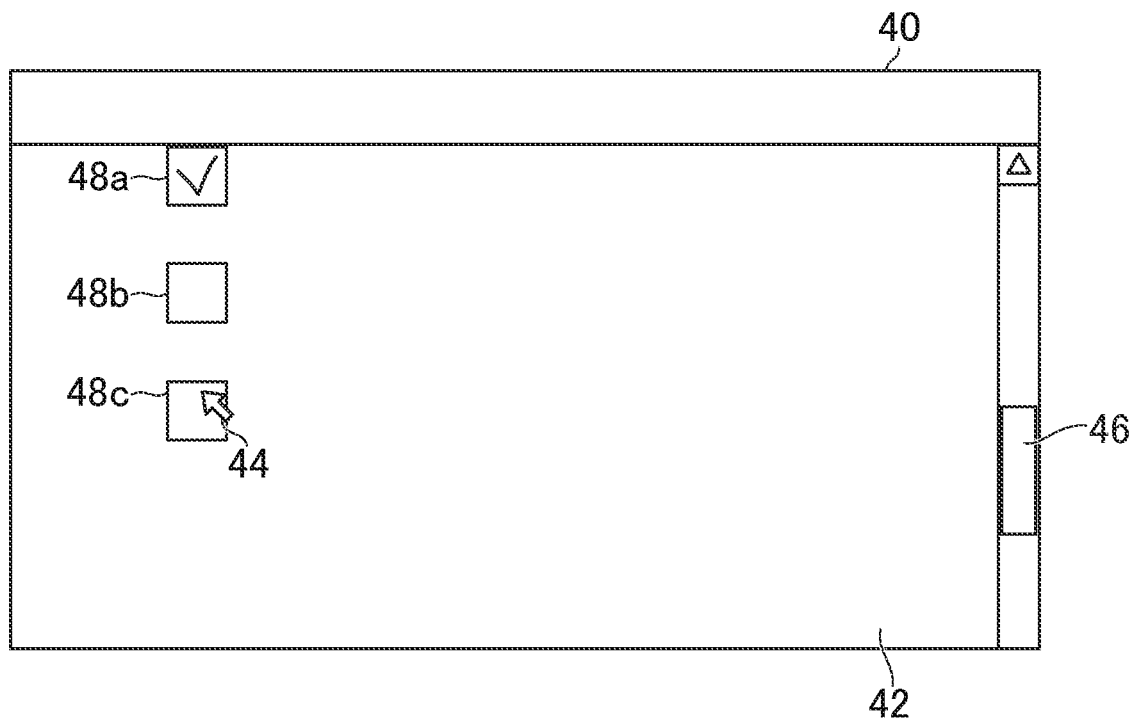
FIG. 3F is a diagram for illustrating an example of a window.

In this situation, in this embodiment, the selection box 48c is not in a checked state, which is different from the intention of the users. Instead, as illustrated in FIG. 3F, at the user terminal 12a, the selection box 48a, which is in a focus state at the reference timing, is in a checked state. That is, in this embodiment, object processing is executed on the selection box 48a, not on the selection box 48c.

In this embodiment, the selection box 48b is not in a focus state at the reference timing. The selection box 48b is brought into a focus state and is then brought into a non-focus state, during a time period T1 from the reference timing until the timing of the selection operation. In such a case, in this embodiment, object processing is not executed on the selection box 48b. That is, the selection box 48b is not in a checked state.

In this way, in this embodiment, object processing is executed on an object that is in a focus state at the timing at which it is estimated that the user A tries to perform a selection operation.

There may be a case in which there are no objects in a focus state at the timing at which it is estimated that the user A tries to perform a selection operation. For example, in such a case, object processing may be executed on an object that is in a focus state immediately before the timing at which it is estimated that the user A tries to perform a selection operation. In this way, in this embodiment, it is possible to appropriately process an operation of a user on shared content after a display update, for example, scrolling by an operation of another user.

The functions of the user terminal 12 in this embodiment and the processing to be executed by the user terminal 12 in this embodiment are now described in detail.

Figure 4:
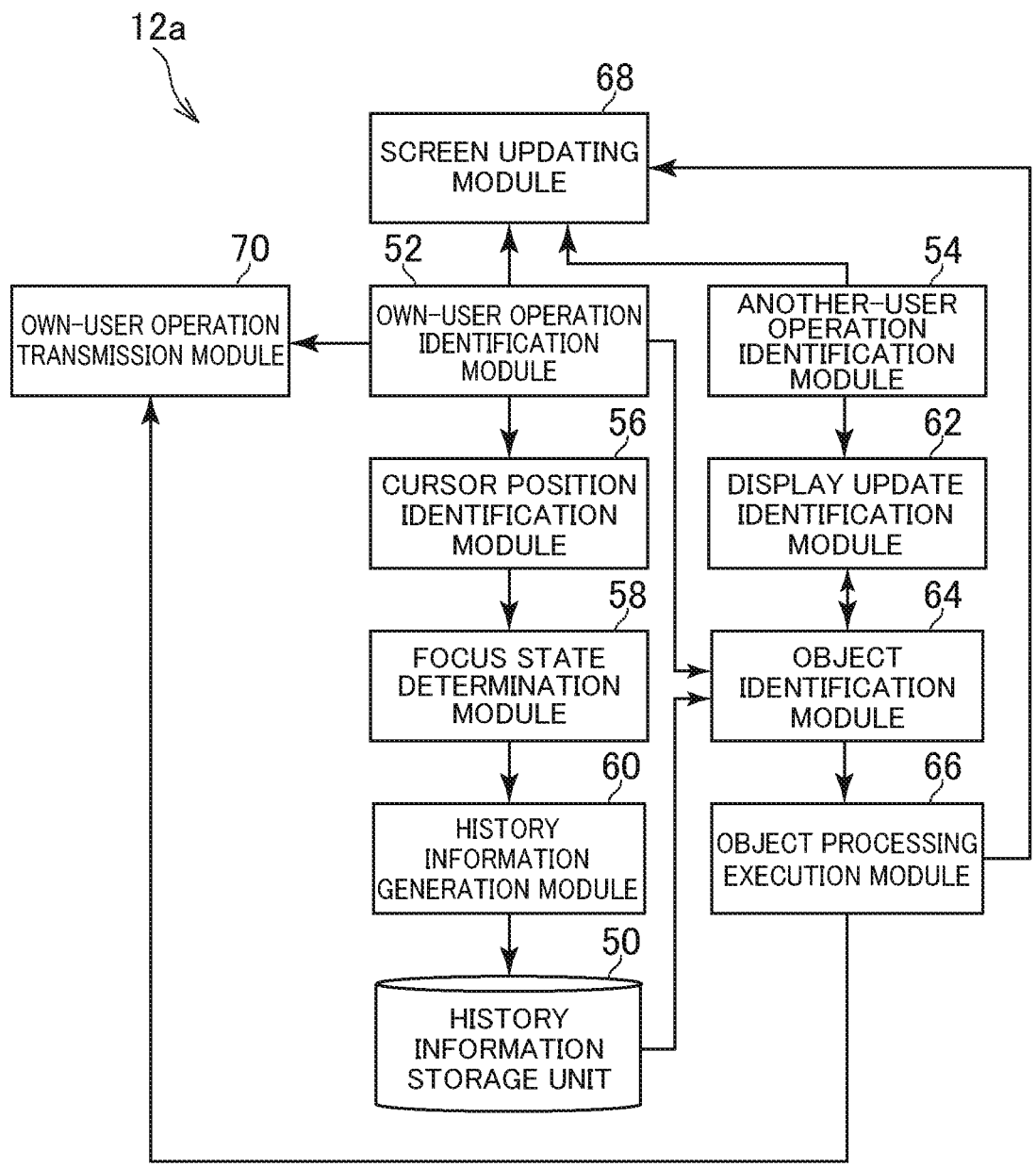
FIG. 4 is a functional block diagram for illustrating an example of functions to be implemented by a user terminal in an embodiment of the present invention.

FIG. 4 is a functional block diagram for illustrating an example of the functions to be implemented by the user terminal 12a in this embodiment. It is not required that all of the functions illustrated in FIG. 4 be implemented by the user terminal 12a in this embodiment, and functions other than the functions illustrated in FIG. 4 may be implemented. The following functions are similarly implemented by the user terminal 12b.

As illustrated in FIG. 4, the user terminal 12a in this embodiment includes, in terms of its functions, for example, a history information storage unit 50, an own-user operation identification module 52, an another-user operation identification module 54, a cursor position identification module 56, a focus state determination module 58, a history information generation module 60, a display update identification module 62, an object identification module 64, an object processing execution module 66, a screen updating module 68, and an own-user operation transmission module 70.

The history information storage unit 50 is mainly implemented by the storage unit 22. The own-user operation identification module 52 is mainly implemented by the processor and the operation unit 28. The another-user operation identification module 54 and the own-user operation transmission module 70 are mainly implemented by the processor 20 and the communication unit 24. The cursor position identification module 56, the focus state determination module 58, the history information generation module 60, the display update identification module 62, the object identification module 64, and the object processing execution module 66 are mainly implemented by the processor 20. The screen updating module 68 is mainly implemented by the processor 20 and the display unit 26.

The above-mentioned functions may also be implemented by the processor 20 executing a program including commands corresponding to the functions, which is installed in the user terminal 12a being a computer. The program may be supplied to the user terminal 12a via, for example, a computer-readable information storage medium such as an optical disc, a magnetic disk, a magnetic tape, and a magneto-optical disk, or via the Internet.

In this embodiment, for example, the history information storage unit 50 is configured to store history information indicating a history of the states of the objects on the shared content.

FIG. 5 is a table for showing an example of focus history information, which is an example of the history information stored in the history information storage unit 50. In the focus history information, there is shown a history of the timing at which an object changes from a non-focus state to a focus state and the timing at which the object changes from a focus state to anon-focus state.

As shown in FIG. 5, the focus history information includes timing information, object identification information, and focus information.

The timing information is, for example, information associated with a timing, such as a value of a time stamp or time.

The object identification information is, for example, identification information on an object that changed from a focus state to a non-focus state or from a non-focus state to a focus state at the timing indicated by the timing information. In the example of FIGS. 5, A, B, and C are shown as pieces of object identification information on the selection box 48a, the selection box 48b, and the selection box 48c, respectively.

The focus information is, for example, information indicating whether the object identified by the object identification information has changed from a focus state to a non-focus state or from a non-focus state to a focus state. In the example of FIG. 5, the change from a non-focus state to a focus state is indicated by "on", and the change from a focus state to a non-focus state is indicated by "off".

In this embodiment, for example, the own-user operation identification module 52 is configured to identify an operation of the user A on the operation unit 28. The own-user operation identification module 52 may identify the operation of the user Abased on input data associated with a physical operation input to be received via the operation unit 28.

For example, the own-user operation identification module 52 may identify that an upward scroll operation has been performed on the webpage 42 by the user A, based on input data indicating that an upward drag operation has been performed on the scroll bar 46. As another example, the own-user operation identification module 52 may identify that a downward scroll operation has been performed on the webpage 42 by the user A, based on input data indicating that a downward drag operation has been performed on the scroll bar 46.

The own-user operation identification module 52 may also identify, for example, that the above-mentioned selection operation has been performed.

In this embodiment, for example, the another-user operation identification module 54 is configured to identify an operation of the user B on the user terminal 12b. For example, the another-user operation identification module 54 may identify the operation of the user B based on the operation information received via the communication unit 24 and associated with the physical operation input by the user B.

For example, when operation information indicating that an upward scroll operation or a downward scroll operation has been performed is received from the user terminal 12b, the another-user operation identification module 54 may identify the upward scroll operation or the downward scroll operation represented by the operation information as the operation of the user B. In this case, the operation information may include information indicating the scroll amount, and the another-user operation identification module 54 may identify the scroll amount in the scroll operation based on that information.

As another example, when operation information representing a selection operation of execution instruction of object processing is received from the user terminal 12b, the another-user operation identification module 54 may identify the selection operation represented by that operation information as the operation of the user B.

In this embodiment, for example, the cursor position identification module 56 is configured to identify the position of the cursor 44 on the shared content, for example, the webpage 42.

In this embodiment, for example, the focus state determination module 58 is configured to determine whether or not the objects arranged in shared content, for example, the webpage 42, are in a focus state or a non-focus state.

The focus state determination module 58 may also detect a change in the state of an object from a focus state to a non-focus state or from a non-focus state to a focus state. For example, the focus state determination module 58 may detect the occurrence of such a change by using a function implemented in a web browser for detecting the occurrence of an onfocus event or an onblur event. The focus state determination module 58 may then determine whether an object is a focus state or a non-focus state based on the detected change.

In this embodiment, for example, the history information generation module 60 is configured to generate history information and store the generated history information in the history information storage unit 50. For example, there may be generated focus history information including timing information indicating the timing at which the above-mentioned change is detected, object identification information on the object for which the change occurred, and focus information in which a value associated with the change is set.

In this embodiment, for example, the display update identification module 62 is configured to identify a display update of the shared content, for example, scrolling of the shared content, by an operation of the user B. In addition to scrolling, other examples of a display update include an update of a displayed slide in shared content including a plurality of slides, and an update of a displayed page in shared content including a plurality of pages. When it is identified by the own-user operation identification module 52 that a selection operation has been performed, the display update identification module 62 may identify whether or not there has been a display update by the operation of the user B during the time period T1 until the timing of the selection operation.

The display update identification module 62 may also store a history of the operations of the user B identified by the another-user operation identification module 54, and then identify whether or not there has been a display update by an operation of the user B during the time period T1 from the reference timing until the current time based on the history of the operations of the user B.

In this embodiment, for example, the object identification module 64 is configured to identify an object on which object processing is to be performed. The object identification module 64 may identify the object on which object processing is to be performed when it is identified by the own-user operation identification module 52 that a selection operation has been performed.

The object identification module 64 may also identify whether or not a predetermined condition relating to a display update by an operation of the user B is satisfied. The object identification module 64 may identify the object on which the object processing is to be performed in accordance with a rule corresponding to whether or not the condition is satisfied.

For example, when the above-mentioned predetermined condition is satisfied, the object identification module 64 may identify an object that is in a focus state at a timing before the reference timing and closest to the reference timing, as the object on which the object processing is to be performed. In this case, the object identification module 64 may identify an object that is in a focus state at a timing before the reference timing and closest to the reference timing, based on the focus history information stored in the history information storage unit 50.

As another example, when there is an object that is in a focus state at the reference timing, the object may be identified as the object on which the object processing is to be performed. As yet another example, an object that is in a focus state at the reference timing and that is brought into a non-focus state during a time period T1 from the reference timing until the timing of the selection operation may be identified as the object on which the object processing is to be performed.

Conversely, when the above-mentioned predetermined condition is not satisfied, the object identification module 64 may identify an object that is in a focus state at the timing of the selection operation as the object on which the object processing is to be performed. In this case, the object identification module 64 may identify an object that is in a focus state at the timing of the selection operation, based on the focus history information stored in the history information storage unit 50.

Examples of the above-mentioned predetermined condition include a condition that the display update identification module 62 has identified that there has been a display update by an operation of the user B during the time period T1 from the reference timing until the timing of the selection operation.

Not only when this condition is satisfied, but also when a further additional condition is satisfied, an object that is in a focus state at a timing before the reference timing and closest to the reference timing may be identified as the object on which the object processing is to be performed.

Examples of the additional condition include: a condition that the length between the position of the cursor 44 on the shared content at the reference timing and the position of the cursor 44 on the shared content at the timing of the selection operation is shorter than a predetermined length; a condition that there is no object that is in a focus state at the timing of selection operation; and a condition that there has not been a display update by an operation of the user B during a time period T2 before the reference timing. The time period T2 may be the same as or different from the time period T1. The time period T2 may be longer or shorter than the time period T1. The additional condition may also be a condition that all of a plurality of conditions among the above-mentioned conditions are satisfied. The time period T2 may be any time period, and may be set based on experimental results or experience, for example.

In this embodiment, for example, the object processing execution module 66 is configured to execute object processing on the object identified by the object identification module 64 as the object on which the object processing is to be performed.

In this embodiment, for example, the screen updating module 68 is configured to update the screen displayed on the display unit 26 of the user terminal 12a based on the operation identified by the own-user operation identification module 52 and the another-user operation identification module 54, a result of the object processing executed by the object processing execution module 66, and the like.

In this embodiment, for example, the own-user operation transmission module 70 is configured to transmit, to the user terminal 12b, operation information representing the operation identified by the own-user operation identification module 52. When object processing has been executed, the own-user operation transmission module 70 may transmit, to the user terminal 12b, operation information representing a selection operation on the object on which the object processing has been executed. In this way, in the user terminal 12b as well, object processing is executed on the identified object in the same way as in the user terminal 12a.

Figure 6:
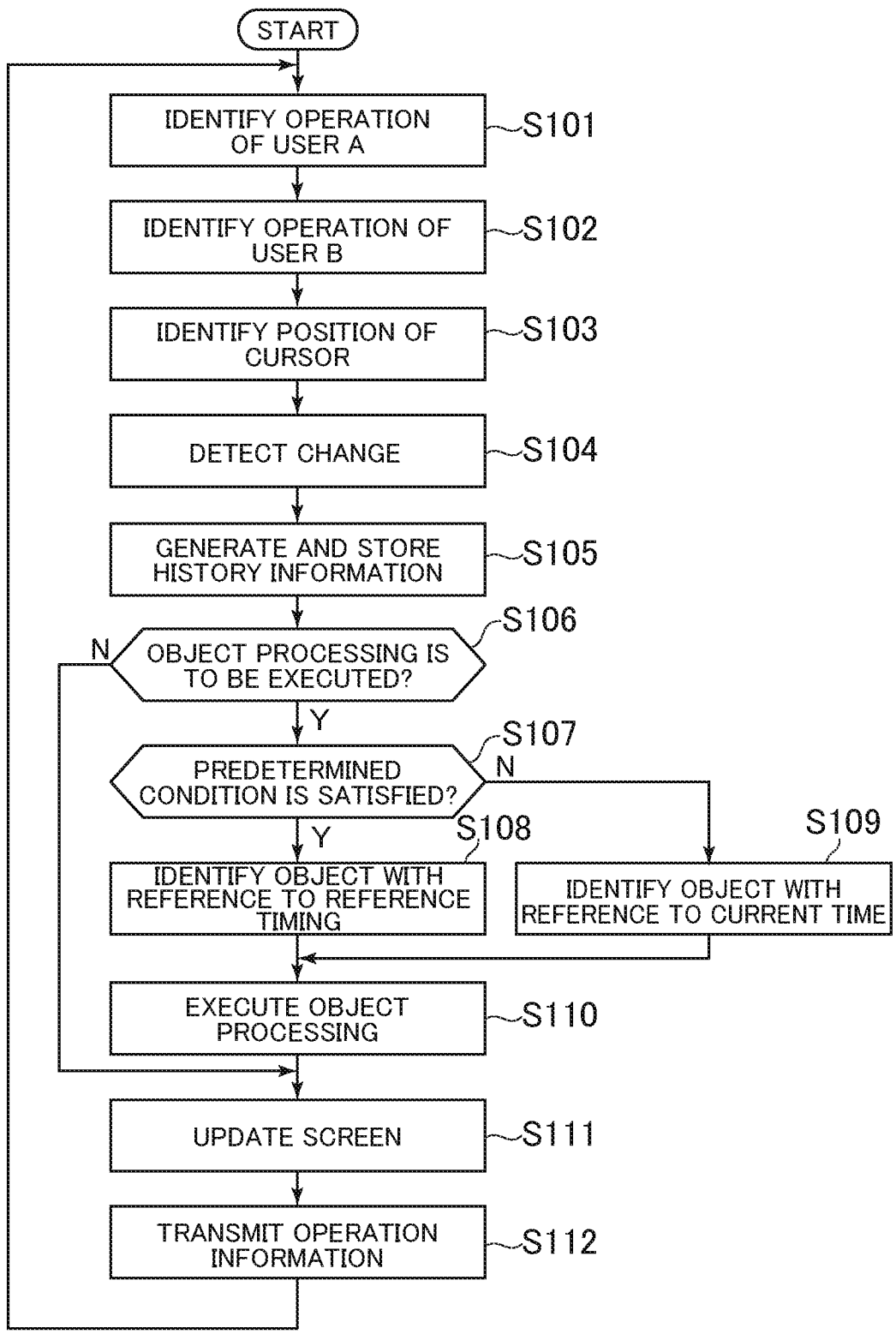
FIG. 6 is a flowchart for illustrating an example of a flow of processing to be performed by the user terminal in an embodiment of the present invention.

Now, a description is given of an example of a flow of processing to be executed by the user terminal 12a in this embodiment with reference to a flowchart illustrated in FIG. 6. The processing illustrated in Step S101 to Step S112 described below is assumed to be repeatedly executed at a predetermined sampling rate.

First, the own-user operation identification module 52 identifies the operation of the user A received via the operation unit 28 of the user terminal 12a (Step S101).

Then, the another-user operation identification module 54 identifies the operation of the user B based on the operation information received from the user terminal 12b via the communication unit 24 of the user terminal 12a (Step S102).

Then, the cursor position identification module 56 identifies the position of the cursor 44 in this loop (Step S103).

Then, the focus state determination module 58 detects, for each object on the webpage 42, a change in the state of the object from a focus state to a non-focus state or from a non-focus state to a focus state (Step S104).

Then, the history information generation module 60 generates focus history information based on the change detected in the processing illustrated in Step S104, and stores the generated focus history information in the history information storage unit 50 (Step S105).

Then, the object identification module 64 determines whether or not object processing is to be executed in the present loop based on the operation identified in the processing illustrated in Step S101 (Step S106).

When it is determined that object processing is to be performed (Step S106: Y), the display update identification module 62 identifies whether or not a predetermined condition is satisfied (Step S107). As described above, the predetermined condition is a condition, for example, the condition that there has been a display update by an operation of the user B during the time period T1 until the current time.

When it is assumed that it is identified that there has been a display update by an operation of the user B during the time period T1 until the current time (Step S107: Y), in this case, the object identification module 64 identifies an object with reference to the reference timing (Step S108). In the processing illustrated in Step S108, as described above, for example, an object that is in a focus state at a timing before the reference timing and is closest to the reference timing is identified as the object on which the object processing is to be performed.

Conversely, when it is assumed that it is identified that there has not been a display update by an operation of the user B during the time period T1 until the current time (Step S107: N), in this case, the object identification module 64 identifies the object with reference to the current time (Step S109). In the processing illustrated in Step S109, as described above, for example, the object that is currently in a focus state is identified as the object on which the object processing is to be performed.

After the processing illustrated in Step S108 or Step S109 is executed, the object processing execution module 66 executes object processing on the object identified as the object on which the object processing is to be performed (Step S110).

When it is determined in the processing illustrated in Step S106 that object processing is not to be executed (Step S106: N), or when the processing illustrated in Step S110 has ended, the screen updating module 68 updates the screen displayed on the display unit 26 of the user terminal 12a (Step S111).

Then, the own-user operation transmission module 70 transmits to the user terminal 12b operation information representing the operation identified in the processing illustrated in Step S101 (Step S112), and returns to the processing illustrated in Step S101. In the processing illustrated in Step S112, as described above, operation information representing a selection operation on an object on which object processing has been executed may be transmitted.

In the processing example illustrated in FIG. 6, the method of synchronizing the timing of the operation of the user A and the timing of the operation of the user B is not particularly limited.

For example, in the loop of the processing illustrated in FIG. 6 described above, the processing illustrated in Step S101 may be executed through use of the latest input data, and immediately after that, the processing illustrated in Step S102 may be executed through use of the latest operation information.

As another example, input data associated with a physical operation input by the user A or operation information associated with a physical operation input by the user B may be associated with a time stamp. Then, with the acquisition of both the input data and the operation information associated with the time stamp of the same time as a trigger, the loop of the processing illustrated in FIG. 6 in which the input data and the operation information are used may be started.

The history information stored in the history information storage unit 50 is not limited to the focus history information shown in FIG. 5. FIG. 7 is a table for showing an example of position history information, which is another example of the history information stored in the history information storage unit 50.

The position history information shown in FIG. 7 is associated with time. The position history information shown in FIG. 7 includes a serial number, cursor position information, and object information.

The serial number is, for example, identification information on the position history information, and is associated with a generation time of the position history information. In place of a serial number, the position history information may include information indicating the generation time of the position history information.

The cursor position information is, for example, information indicating the position of the cursor 44 in the screen.

The object information is, for example, information indicating an attribute, for example, the position of the object. In this embodiment, the position history information includes a plurality of pieces of object information associated with respective objects. In FIG. 7, there is representatively shown object information on the selection box 48a.

The object information includes, for example, position information, size information, scroll user information, and clickability information. The position information is, for example, information indicating the position of the object. The size information is, for example, information indicating the size of the object. The scroll user information is, for example, information indicating the user who executed the scroll operation on the object. The clickability information is, for example, information indicating whether or not the object is clickable.

As shown in FIG. 7, the cursor position information and the position information and size information included in the object information may be expressed by coordinate values. The coordinate values may represent, for example, a position on the screen expressed in a coordinate system having the upper left corner of the screen of the display unit 26 as an origin.

The position history information shown in FIG. 7 may be generated, for example, based on the above-mentioned predetermined sampling rate. The focus state determination module 58 may determine whether or not each object is in a focus state or a non-focus state based on the position history information shown in FIG. 7. The object identification module 64 may identify an object that is in a focus state at a timing before the reference timing and closest to the reference timing based on the position history information shown in FIG. 7. The object identification module 64 may also identify an object that is in a focus state at the timing of the selection operation based on the position history information shown in FIG. 7.

The above-mentioned object may change in size as time passes. In this case, the values (a21, b21), (a22, b22), and (a23, b23) of the size information shown in FIG. 7 are different from each other. The above-mentioned object may be also be an object having a size that does not change. In this case, the values (a21, b21), (a22, b22), and (a23, b23) of the size information shown in FIG. 7 are the same. The position of the above-mentioned object may change as time passes. Further, the position of the above-mentioned object may not change as time passes. In this way, in this embodiment, the above-mentioned object can be handled even when the object moves.

As described above, in this embodiment, when the above-mentioned predetermined condition is satisfied, object processing is executed on an object that is in a focus state at a timing before the reference timing and closest to the reference timing. The predetermined condition is, for example, a condition that there has been a display update by another user during the time period from the reference timing until the timing of the selection operation.

As described above, in this embodiment, in the determination of the object on which the object processing is to be executed, consideration is given to a display update by an operation of another user from the reference timing until the timing of the selection operation. Therefore, in this embodiment, it is possible to appropriately process an operation of the user on the shared content after a display update by an operation of another user.

It is required that information indicating the changed check state of the selection box 48 be transmitted to the user terminal 12b each time object processing on the selection box 48 is executed. For example, in the situation illustrated in FIG. 3F, it is assumed that not the selection box 48a but the selection box 48c is changed to a checked state. In this case, in order for the processing intended by the user A to be executed, it is required that the user A perform a selection operation on the selection box 48a and then perform a selection operation on the selection box 48c. In this case, transmission of the information indicating the check state of the selection box 48, which is originally not required, is redundantly performed twice. In this embodiment, the occurrence of such redundant processing at the user terminal 12a and the user terminal 12b and redundant network traffic can be prevented.

The present invention is not limited to the embodiment described above.

In place of a click operation on the mouse, a tap operation on the touch panel may be treated as an operation of execution instruction of predetermined processing.

Further, for example, the cursor position identification module 56 may identify the position of the cursor 44 displayed by a floating touch operation.

As another example, movement or the like of the user in a three-dimensional space identifiable based on an image photographed by the camera unit 30 or the like may be treated as an operation of execution instruction of predetermined processing.

As yet another example, the content sharing system 10 may include the user terminal 12a and the user terminal 12b connected to each other by peer-to-peer (P2P) or the like, and not include the server 14.

Further, the specific character strings and numerical values described above and the specific numerical values and character strings in the drawings are merely exemplary, and the present invention is not limited to those character strings and numerical values.

The invention claimed is:
1. A content sharing system, comprising:
at least one processor; and
at least one memory device that stores a plurality of instructions, which when executed by the at least one processor, causes the at least one processor to:

share content between a first user terminal and a second user terminal, where the shared content can be manipulated by both the first user terminal and the second user terminal;

identify that a first operation has been performed by the first user terminal at time t1, the first operation resulting in executing a predetermined processing;

identify a display update of the shared content by a second operation of the second user terminal; and identify a position of a cursor arranged on the shared content of the first user terminal;

determine whether an object on the shared content of the first user terminal is in a focus state or is in a non-focus state;

execute the predetermined processing on the object if the object was in a focus state at a time that is before a time t2 and that is closest to the time t2, when it is identified that the display update has been performed during a time between time t2 and t1, wherein the time t2 is t1 minus a predetermined time period.

2. The content sharing system according to claim 1, wherein the at least one memory device that stores the plurality of instructions further causes the at least one processor to:

execute the predetermined processing on an object that is in a focus state at a time earlier than a timing of the first operation by the predetermined time period and that is brought into a non-focus state during the predetermined time period until the first operation, when it is identified that the display update has been performed during the predetermined time period until the first operation.

3. The content sharing system according to claim 1, wherein the at least one memory device that stores the plurality of instructions further causes the at least one processor to:

execute the predetermined processing on an object that is in a focus state at a timing that is before the time earlier than the first operation by the predetermined time period and that is closest to the time earlier than the first operation by the predetermined time period, when a length between a position of the cursor on the shared content at the time earlier than the first operation by the predetermined time period and a position of the cursor on the shared content at a timing of the first operation is shorter than a predetermined length.

4. The content sharing system according to claim 1, wherein the at least one memory device that stores the plurality of instructions further causes the at least one processor to:

execute the predetermined processing on an object that is in a focus state at a timing that is before the time earlier than the first operation by the predetermined time period and that is closest to the time earlier than the first operation by the predetermined time period, when there is no object in a focus state at the timing of the first operation.

5. The content sharing system according to claim 1, wherein the at least one memory device that stores the plurality of instructions further causes the at least one processor to:

execute the predetermined processing on an object in a focus state at a timing that is before the time earlier than the first operation by the predetermined time period and that is closest to the time earlier than the first operation by the predetermined time period, when the display update has not been performed before the time earlier than the first operation by the predetermined time period.

6. A content sharing method, comprising:

sharing content between a first user terminal and a second user terminal, where the shared content can be manipulated by both the first user terminal and the second user terminal;

identifying that a first operation has been performed by the first user terminal at time t1, the first operation resulting in executing a predetermined processing;

identifying a display update of the shared content by a second operation of the second user terminal; and identifying a position of a cursor arranged on the shared content of the first user terminal;

determining whether an object on the shared content of the first user terminal is in a focus state or is in a non-focus state; and executing the predetermined processing on the object if the object was in a focus state at a time that is before a time t2 and that is closest to the time t2, when it is identified that the display update has been performed during a time between time t2 and t1, wherein the time t2 is t1 minus a predetermined time period.

7. A non-transitory computer readable information storage medium storing a program which is to be executed by a computer to execute the procedures of:

sharing content between a first user terminal and a second user terminal, where the shared content can be manipulated by both the first user terminal and the second user terminal;

identifying that a first operation has been performed by the first user terminal at time t1, the first operation resulting in executing a predetermined processing;

identifying a display update of the shared content by a second operation of the second user terminal; and identifying a position of a cursor arranged on the shared content of the first user terminal;

determining whether an object on the shared content of the first user terminal is in a focus state or is in a non-focus state; and executing the predetermined processing on the object if the object was in a focus state at a time that is before a time t2 and that is closest to the time t2, when it is identified that the display update has been performed during a time between time t2 and t1, wherein the time t2 is t1 minus a predetermined time period.

* * * * *